US008786896B2

(12) United States Patent
Marumoto et al.

(10) Patent No.: US 8,786,896 B2
(45) Date of Patent: Jul. 22, 2014

(54) IMAGE PROCESSING METHOD AND IMAGE PROCESSING APPARATUS FOR REDUCING THE BAD EFFECTS OF SEAM LINES THAT APPEAR AT THE BOUNDARY PORTIONS FOR EACH PRINTING SCAN IN A SERIAL TYPE PRINTER

(75) Inventors: Yoshitomo Marumoto, Yokohama (JP); Hitoshi Tsuboi, Kawasaki (JP); Takayuki Ushiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 13/354,619

(22) Filed: Jan. 20, 2012

(65) Prior Publication Data

US 2012/0188562 A1    Jul. 26, 2012

(30) Foreign Application Priority Data

Jan. 25, 2011    (JP) .................. 2011-013019

(51) Int. Cl.
*G06K 15/02* (2006.01)
*G06K 15/10* (2006.01)
*H04N 1/60* (2006.01)
*H04N 1/40* (2006.01)
*H04N 1/405* (2006.01)

(52) U.S. Cl.
USPC ............. 358/1.2; 358/1.8; 358/1.9; 358/3.01; 358/3.06

(58) Field of Classification Search
USPC ........ 358/1.2, 1.8, 3.03, 1.9, 3.01, 3.06, 3.22, 358/3.31, 1.12, 1.18, 3.12, 3.15, 452, 453, 358/540, 474, 501, 520; 347/1, 6, 9, 12, 14, 347/19, 5, 7, 16, 15, 13, 23, 40, 37, 101, 347/103, 110, 201, 232, 54, 49
See application file for complete search history.

(56) References Cited

U.S. PATENT DOCUMENTS

| 7,506,946 | B2 * | 3/2009 | Tsuboi et al. .................. 347/13 |
| 7,552,996 | B2 | 6/2009 | Ochiai et al. |
| 7,585,038 | B2 | 9/2009 | Shibata et al. |
| 7,585,039 | B2 | 9/2009 | Ochiai et al. |
| 7,614,713 | B2 | 11/2009 | Marumoto |
| 7,695,087 | B2 | 4/2010 | Tsuboi |
| 7,726,763 | B2 | 6/2010 | Ochiai et al. |
| 7,837,283 | B2 | 11/2010 | Goto et al. |
| 2005/0219279 | A1 * | 10/2005 | Goto et al. ...................... 347/5 |
| 2009/0015611 | A1 | 1/2009 | Ochiai et al. |
| 2009/0015849 | A1 * | 1/2009 | Jahana et al. |
| 2009/0219317 | A1 * | 9/2009 | Masuyama ..................... 347/12 |

FOREIGN PATENT DOCUMENTS

JP    4217651 B2    2/2009

* cited by examiner

*Primary Examiner* — Ngon Nguyen
(74) *Attorney, Agent, or Firm* — Fitzpatrick, Cella, Harper & Scinto

(57) ABSTRACT

Provided is an image processing apparatus and image processing method that are capable of outputting an image wherein seam lines caused by sudden conveyance error are difficult to notice even for a small number of multi passes printing. In order to achieve this, the number of dots that are printed in pixels is adjusted according to the density level so that the number of dots that are printed in pixels corresponding to boundary portions is larger than in pixels corresponding to areas that are not boundary portions, and so that the number of dots that are printed in pixels corresponding to boundary portions increases the higher the density level of the pixels is. As a result, it is possible to avoid the occurrence of white stripes in high-density areas without emphasizing black stripes in low-density areas.

11 Claims, 18 Drawing Sheets

| 1 | 3 | 4 | 2 | 1 | 4 | 2 | 3 | 1 | 3 | 3 | 1 |
|---|---|---|---|---|---|---|---|---|---|---|---|
| 4 | 2 | 1 | 3 | 3 | 2 | 4 | 1 | 4 | 2 | 2 | 4 |
| 4 | 2 | 1 | 3 | 1 | 2 | 4 | 1 | 2 | 4 | 1 | 3 |
| 3 | 1 | 4 | 2 | 4 | 3 | 2 | 3 | 3 | 1 | 4 | 2 |

FIG.10

| | NO CORRECTION | CORRECTION |
|---|---|---|
| LARGE CONVEYANCE AMOUNT WHITE STRIPES |  |  |
| SMALL CONVEYANCE AMOUNT BLACK STRIPES |  |  |

IMAGE PROCESSING METHOD AND IMAGE PROCESSING APPARATUS FOR REDUCING THE BAD EFFECTS OF SEAM LINES THAT APPEAR AT THE BOUNDARY PORTIONS FOR EACH PRINTING SCAN IN A SERIAL TYPE PRINTER

BACKGROUND OF THE INVENTION

1. Field of the Invention

The present invention relates to a serial type inkjet printing apparatus. The invention particularly relates to an image processing method and image processing apparatus for reducing the bad effects of seam lines that appear at the boundary portions for each printing scan in a serial type printer.

2. Description of the Related Art

In a serial type inkjet printer, images are gradually printed by alternately repeating a main scan of moving while discharging ink, and a conveyance operation of conveying a printing medium in a direction crossing to the main scan. When there is fluctuation in conveyance amount during a plurality of conveyance operations while printing, seam lines such as white stripes or black stripes between the images (between bands) that are printed in each scan occur, which causes the image to become degraded. For example, when the conveyance amount of printing medium becomes greater than a specified value, white areas where no dots are printed become exposed and a white stripe occurs. On the other hand, when the conveyance amount of the printing medium is less than a specified value, more dots than needed are printed over each other in the boundary portion and a black stripe occurs.

It is known that such seam lines can be reduced a certain extent by applying multi-pass printing that completes an image of a unit area by performing multiple main scans. In multi-pass printing, image data that can be printed in one main scan are completed in multiple printing scans, then, when doing this, a conveyance operation having an amount that is shorter than the printing width of the printing head is performed between each printing scan. Therefore, an area of the printing medium that becomes a boundary portion during a certain main scan does not becomes a boundary portion in another main scan, so seam lines that are characteristic of the boundary portion are reduced. In this kind of multi-pass printing, the more multi passes there are, the less noticeable the seam lines become. However, on the other hand, the number of main scans necessary for completing an image also increases, so more time is required for printing. In other words, there is a tradeoff relationship between reducing the seam lines and throughput of the image output.

In regard to this problem, Japanese Patent No. 4,217,651, for example, discloses a printing method for making seam line less noticeable even when performing multi-pass printing using a small number of multi passes. More specifically, Japanese Patent No. 4,217,651 discloses a method for avoiding the appearance of black stripes and white stripes concerned by changing the conveyance amount to a large amount or a small amount according to the printing duty of the boundary portion that is obtained from the image data. Japanese Patent No. 4,217,651 also discloses a method of adjusting the printing duty in actual printing corresponding to the boundary portion by correcting the image data according to the printing duty value. With Japanese Patent No. 4,217,651, by setting the conveyance amount to a large amount in the case of a printing duty for which black stripes are a concern, and setting the conveyance amount to a small amount in the case of a printing duty for which white stripes are a concern, it is possible to output a uniform image with no noticeable black stripes or white stripes.

However, even though the method disclosed in Japanese Patent No. 4,217,651 is effective in reducing the state of seam lines predicted from the printing duty, this method is not able to avoid black stripes or white stripes that suddenly appear due to fluctuations in the conveyance operation. In addition, in the method disclosed in Japanese Patent No. 4,217,651, it is possible to adjust how noticeable seam lines will be within the controllable range of the conveyance amount; however, it is not able to handle small seam lines that occur due to error in the conveyance amount.

SUMMARY OF THE INVENTION

The object of the present invention is to solve the problems mentioned above. Therefore, the object of the present invention is to provide an image printing apparatus and image processing method that are capable of outputting images wherein seam lines caused by sudden conveyance error are difficult to notice even in the case of a small number of multi passes.

In a first aspect of the present invention, there is provided an image processing method for printing an image on a printing medium by repeatedly performing a main scan that performs printing on a printing medium according to image data while moving a printing head, having arrays of nozzles that discharge ink, in a direction that crossing to the direction of the nozzle arrays, and a conveyance operation that conveys the printing medium in the direction of the nozzle arrays, the image processing method comprising: an adjustment step of performing adjustment so that the number of dots that are printed in pixels corresponding to boundary portions printed by continuous main scans respectively is greater than the number of dots that are printed in pixels corresponding to areas other than the boundary portions; wherein the adjustment step adjusts the number of dots that are printed in the pixels according to the density level of the image data of the pixels so that the number of dots that are printed in the pixels corresponding to the boundary portions is more greater than the number of dots that are printed in pixels corresponding to areas other than the boundary portions the higher the value of the density level is.

In a second aspect of the present invention, there is provided an image printing apparatus for printing an image on a printing medium by repeatedly performing a main scan that performs printing on a printing medium according to image data while moving a printing head, having arrays of nozzles that discharge ink, in a direction that is crossing to the direction of the nozzle arrays, and a conveyance operation that conveys the printing medium in the direction of the nozzle arrays, the image printing apparatus comprising: adjustment unit that is configured to perform adjustment so that the number of dots that are printed in the pixels corresponding to boundary portions printed by continuous main scans respectively is greater than in pixels corresponding to areas other than the boundary portions; wherein the adjustment unit adjusts the number of dots that are printed in the pixels corresponding to the boundary portions according to the density level of the image data of the pixels so that the number of dots that are printed in the pixels corresponding to the boundary portions is more greater than the number of dots that are printed in pixels corresponding to areas other than the boundary portions the higher the value of the density level is.

Further features of the present invention will become apparent from the following description of exemplary embodiments (with reference to the attached drawings).

BRIEF DESCRIPTION OF THE DRAWINGS

FIG. 10 is a diagram illustrating level values where each 2×2 area becomes printing (1);

DESCRIPTION OF THE EMBODIMENTS

In the following, the embodiments of the present invention are explained in detail.
(Embodiment 1)

Figure 1:
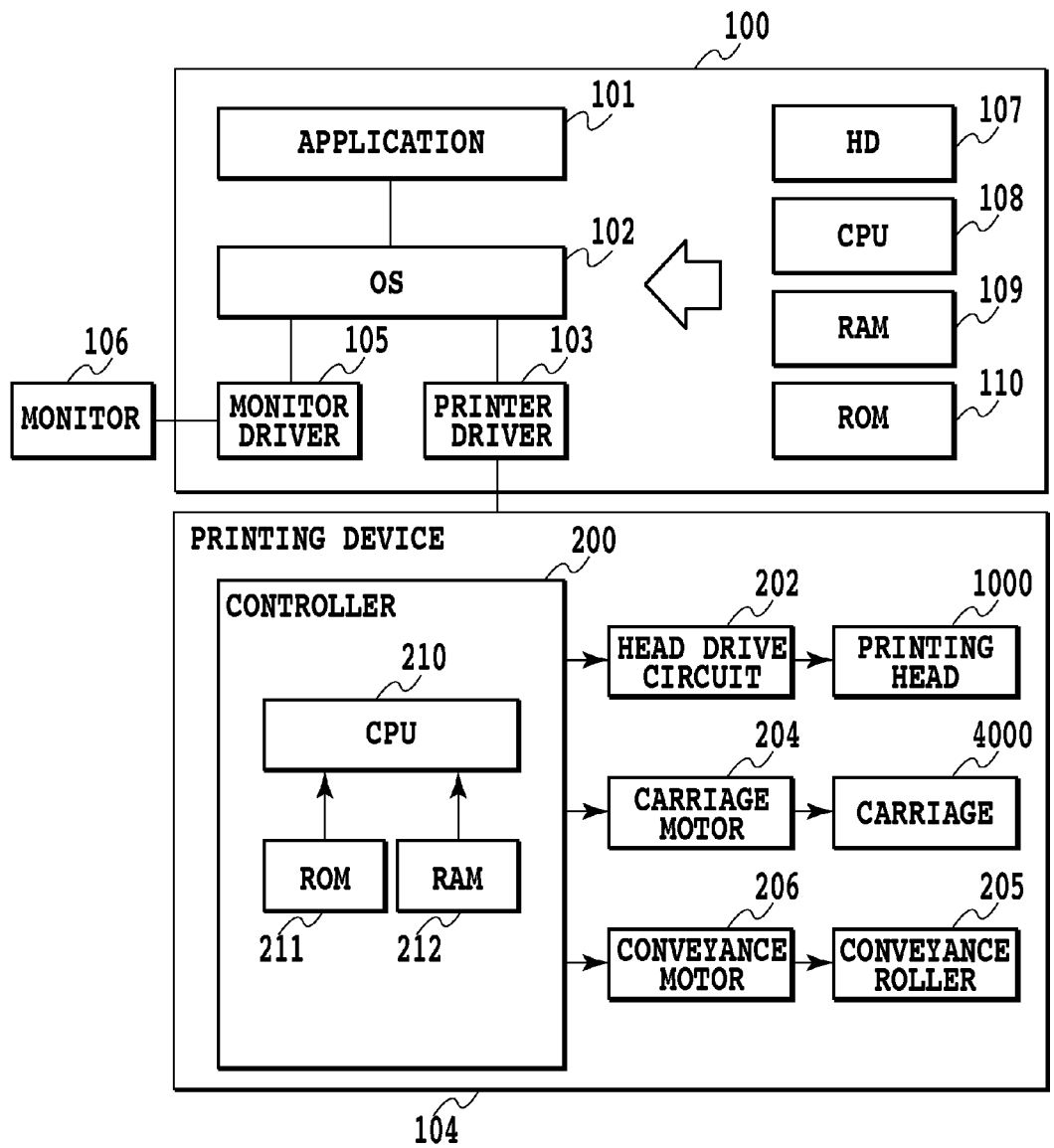
FIG. 1 is a block diagram illustrating the construction of a host device and printing device of a printing system.

FIG. 1 is a block diagram illustrating the construction of a host device 100 and printing apparatus 104 of a printing system to which the present invention can be applied. A CPU 108, via an operating system 102, operates each of the software of an application 101, printer driver 103 and monitor driver 105 according to various programs stored in a hard disk (HD) 107 or ROM 110. When doing this, a RAM 109 is used as a work area when executing various processes. The monitor driver 105 is software for executing processing such as creating image data to be displayed on the monitor 106. The printer driver 103 is software for converting image data that is sent from the application software 101 to the OS 102 to image data that can be received by the printing apparatus 104, and after that transmitting that image data to the printing apparatus 104.

On the other hand, a controller 200, a printing head 1000, a head drive circuit 202, a carriage 4000, a carriage motor 204, a conveyance roller 205, a conveyance motor 206 and the like are provided in the printing apparatus 104. The head drive circuit 204 is a circuit for driving the printing head 1000, and the printing head 1000 is driven by the head drive circuit 202 and ink is discharged. The carriage motor 204 is a motor for moving back-and-forth the carriage 4000 mounting the printing head 1000. The conveyance motor 206 is a motor for driving the conveyance roller 205 for conveying a printing medium. A microprocessor CPU 210, ROM 211 in which a control program is stored, and RAM 212 that is used when the CPU performs processing of image data are provided in the controller 200 that performs overall control of the printing device. The ROM 211 stores control programs for controlling multi-pass printing, dot arrangement patterns, or mask patterns of the embodiments described later. The controller 200, for example, in order to execute multi-pass printing, performs control of the head driving circuit 202, carriage motor 204 and conveyance motor 206, as well as generates image data that corresponds to each scan of the multi-pass printing. More specifically, the controller 200 reads out a mask pattern from the ROM 211 according to a control program for example, and uses that read out mask pattern to divide the image data for a unit area into image data to be printed by the nozzle block corresponding to each scan of the multi-pass printing. Furthermore, the controller 200 controls the head drive circuit 202 so that ink is discharged from the printing head 1000 according to this divided image data.

Figure 2:
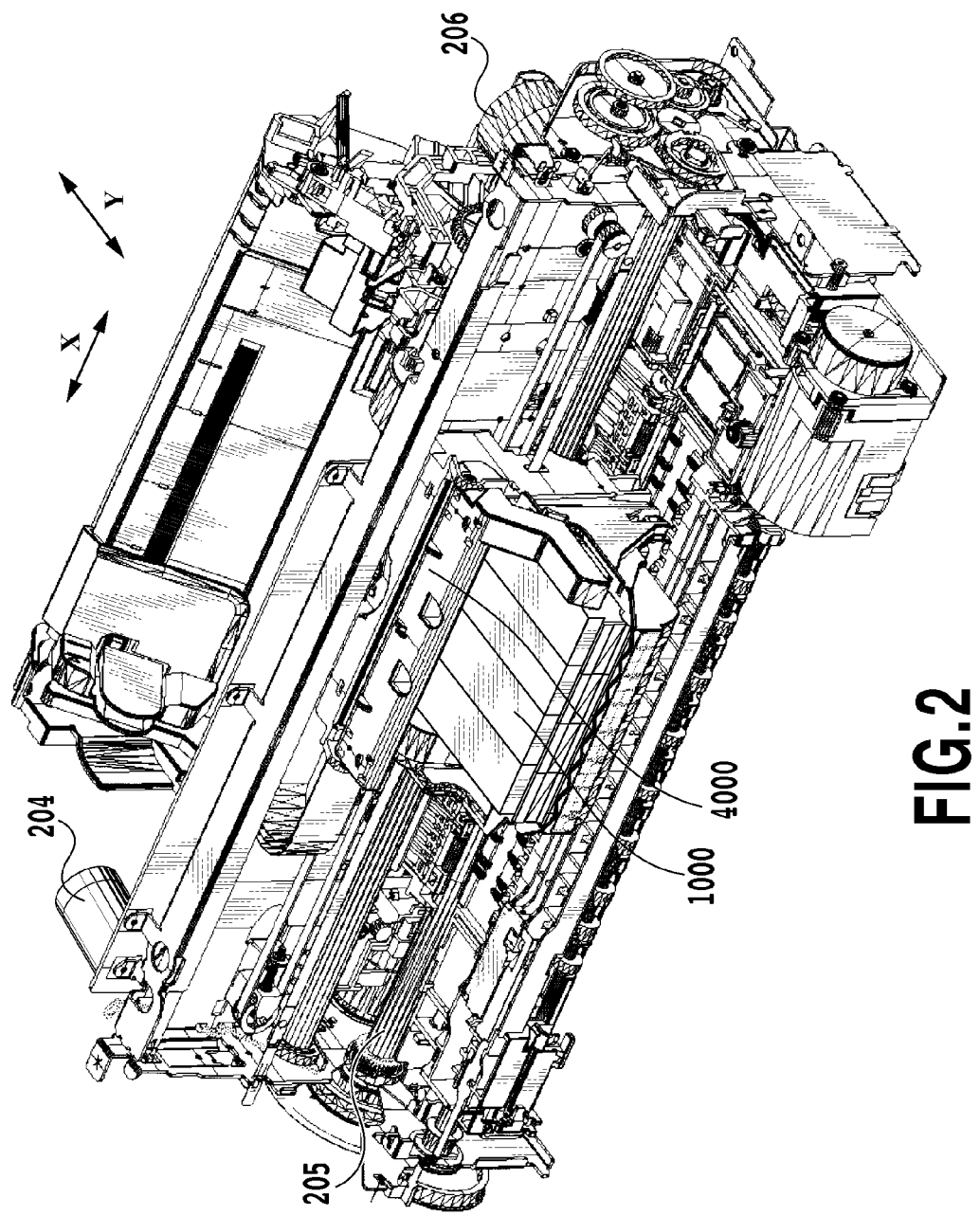
FIG. 2 is a perspective diagram for explaining the basic construction of a printing device.

FIG. 2 is a perspective diagram for explaining the basic construction of a printing apparatus 104 that is used in this embodiment. The carriage 4000, which functions as a movement unit, is mounted with the printing head 1000 that comprises four nozzle groups that discharge cyan (C), magenta (M), yellow (Y) and black (K) ink, respectively, and is able to move in the X direction (second direction) in the figure. According to image data received from the host device, the controller 200 causes the printing head 1000 to execute the ink discharge operation while being moved in the X direction by the carriage 4000. After one printing scan by the printing head 1000 is finished, the printing medium is conveyed in the Y direction, which is orthogonal to the X direction, by the conveyance unit that comprises the conveyance roller 205, and is conveyed an amount corresponding to the number of passes of the multi-pass printing. After that, by repeating printing as the head moves in the X direction (head movement direction) and conveyance in the Y direction, an image is gradually formed on the printing medium.

Figure 3:
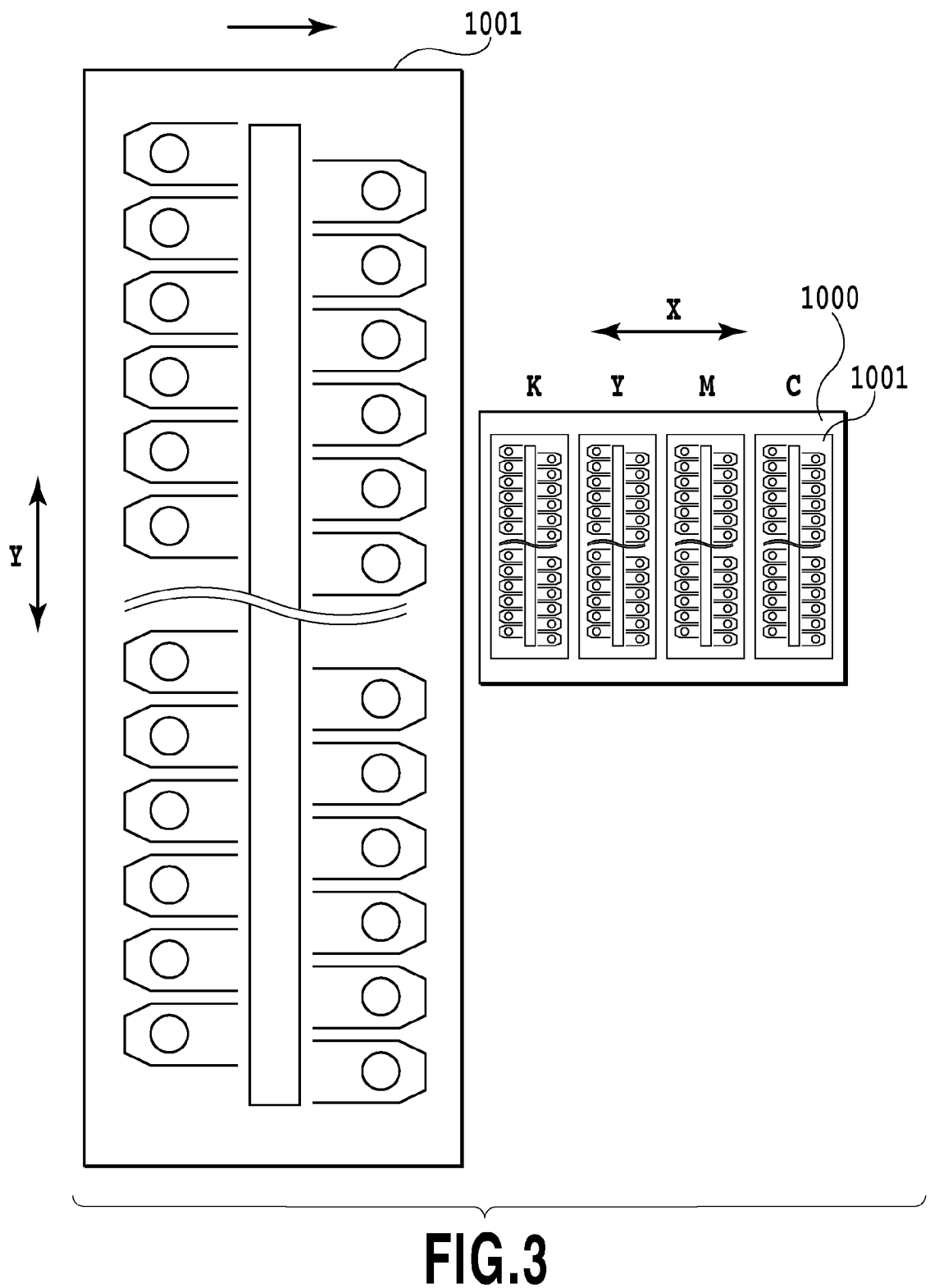
FIG. 3 is a schematic diagram for explaining the nozzle arrangement of the printing head.

FIG. 3 is a schematic diagram for explaining the nozzle arrangement of the printing head 1000 used in this embodiment. The printing head 1000 of this embodiment comprises four nozzle groups 1001 that respectively discharge four kinds of ink, first to fourth ink, and that are arranged in the X direction (head movement direction). In this embodiment, the first ink is cyan (C), the second ink is magenta (M), the third ink is yellow (Y) and the fourth ink is black (K). The nozzle group 1001 of each color has 256 nozzles that are arranged in the first direction. More specifically, the nozzle group 1001 of each color has two arrays of nozzles arranged in the first direction (here, this is the Y direction) with 128 nozzles in each array at a pitch of 600 dpi, and these two arrays of nozzles are arranged with a half a pitch shift from each other in the first direction. In other words, by performing the operation of discharging ink from the individual nozzles as the printing head 1000 moves in the X direction, it is possible to print an image having a resolution of 1200 dpi (dots/inch) in the Y direction. In this embodiment, a printing head comprising a plurality of nozzle groups that correspond to the ink colors and that have a plurality of nozzle arrays each for discharging ink of the same color is used in this way.

In this embodiment, in order for simplification, the arrangement direction of the plurality of nozzles that discharge ink of the same color is explained as coinciding with the conveyance direction (Y direction) of the printing medium. However, in the present invention, the arrangement direction of the nozzles does not absolutely need to coincide with the conveyance direction (Y direction). Even when the arrangement direction of the nozzles (first direction) is angled somewhat with respect to the Y direction, it is still possible to obtain the same effect of the present invention explained below.

Figure 4:
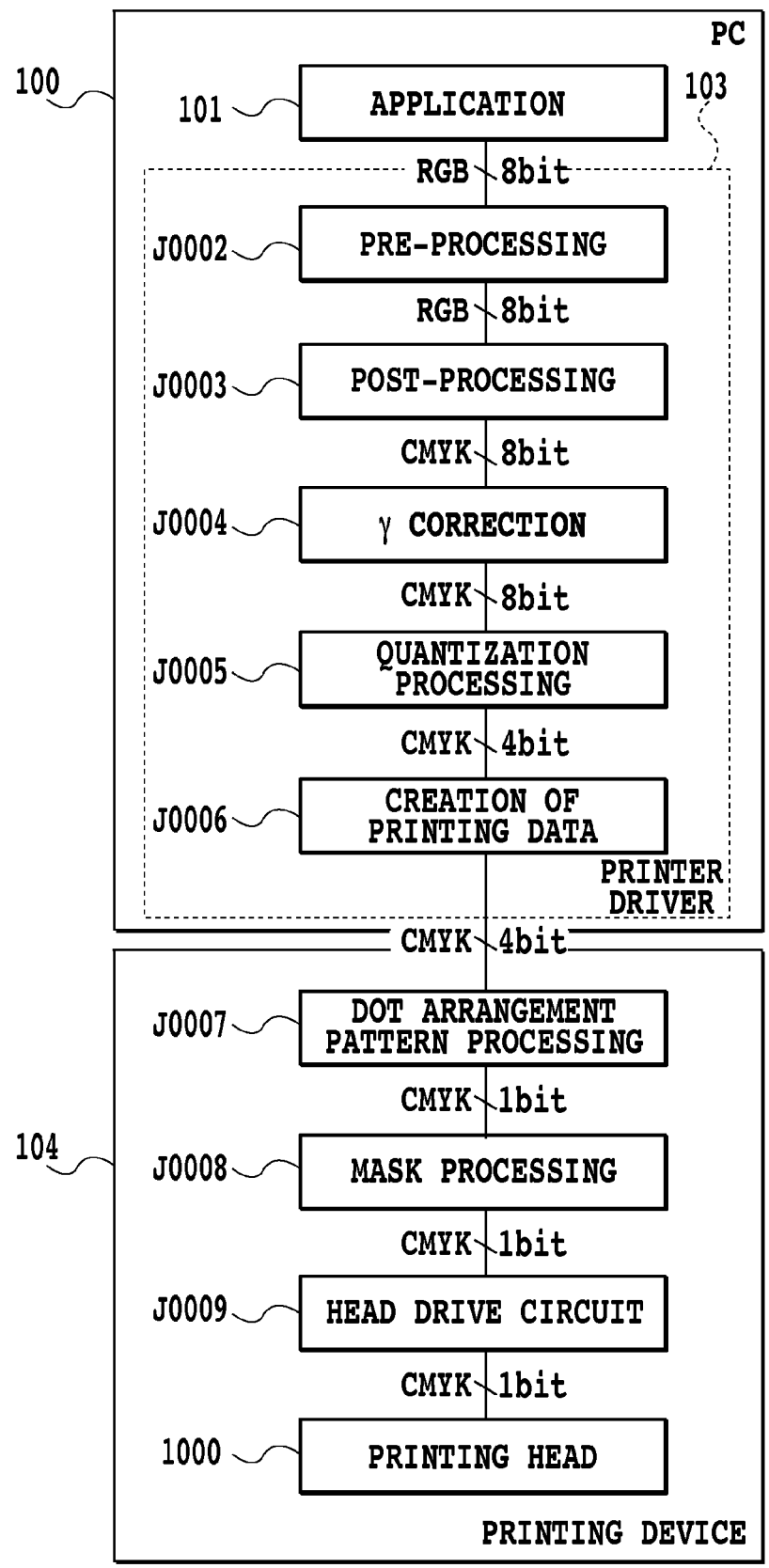
FIG. 4 is a block diagram for explaining the flow of image processing that is executed by the host device and the printing device.

FIG. 4 is a block diagram for explaining the flow of the image processing that is executed by the host device 100 and printing apparatus 104 of the printing system explained above.

With the host device 100, a user can use an application 101 and create image data that will be printed by the printing apparatus 104. When printing, the image data that was created by the application 101 is transferred to the printer driver 103.

The printer driver 103 of this embodiment executes processing such as pre-processing J0002, post-processing J0003, γ correction J0004, binarization processing J0005 and printing data creation processing J0006.

In the pre-processing J0002, referencing FIG. 1, the application 101 performs color conversion and converts the color range of the image that is displayed on the monitor 106 via the monitor driver 105 to the color range of the printing apparatus 104. More specifically, image data R, G and B that is expressed in 8 bits is converted to 8-bit data R, G and B in the color range of the printing apparatus 104 by referencing a 3-dimensional LUT that is stored in the ROM 110.

Next, in post-processing J0003, signal value conversion is performed so that R, G and B after conversion is expressed by the four ink colors C, M, Y and K that are discharged by the printing head 1000 mounted in the printing apparatus 104. More specifically, the 8-bit data R, G and B that is obtained in pre-processing J0002 is converted to C, M, Y and K 8-bit data by referencing a 3-dimensional LUT that is stored in the ROM 110.

Next, in γ correction J0004, γ correction is performed for the CMYK data that was obtained in post-processing J0003. More specifically, primary conversion is performed so that the 8-bit data CMYK that was obtained in color separation is linearly correlated with the gradation characteristics of the printing device.

In quantization processing J0005, a specified quantization processing method is used to convert the γ corrected 8-bit data C, M, Y and Y to 4-bit 5-value data C, M, Y and K. The image data after quantization has values from level 0 to level 4, and are indices for dot arrangement patterns that are referenced in dot arrangement pattern expansion processing J0007 that is performed by the printing apparatus 104.

In printing data creation processing J0006, control information that is related to a printing operation such as printing medium information, printing quality information and paper feed information and the like is added to the 4-color 4-bit data that was created in quantization processing J0005, and printing data is created. The printing data that is created as described above is supplied to the printing apparatus 104 from the host device 100.

In the printing device 104, first, the dot arrangement pattern processing J0007 converts all of the 600 dpi 4-bit image data that is included in the inputted printing data to 1-bit data corresponding to the printing resolution 1200 dpi of the printing device 104. More specifically, by referencing the dot arrangement pattern that is set corresponding to the level value of the input data, 600 dpi 4-bit image data is converted to 1200 dpi 1-bit data that indicates printing (1) or no printing (0) of dots for each pixel of 1200 dpi.

Figure 5:
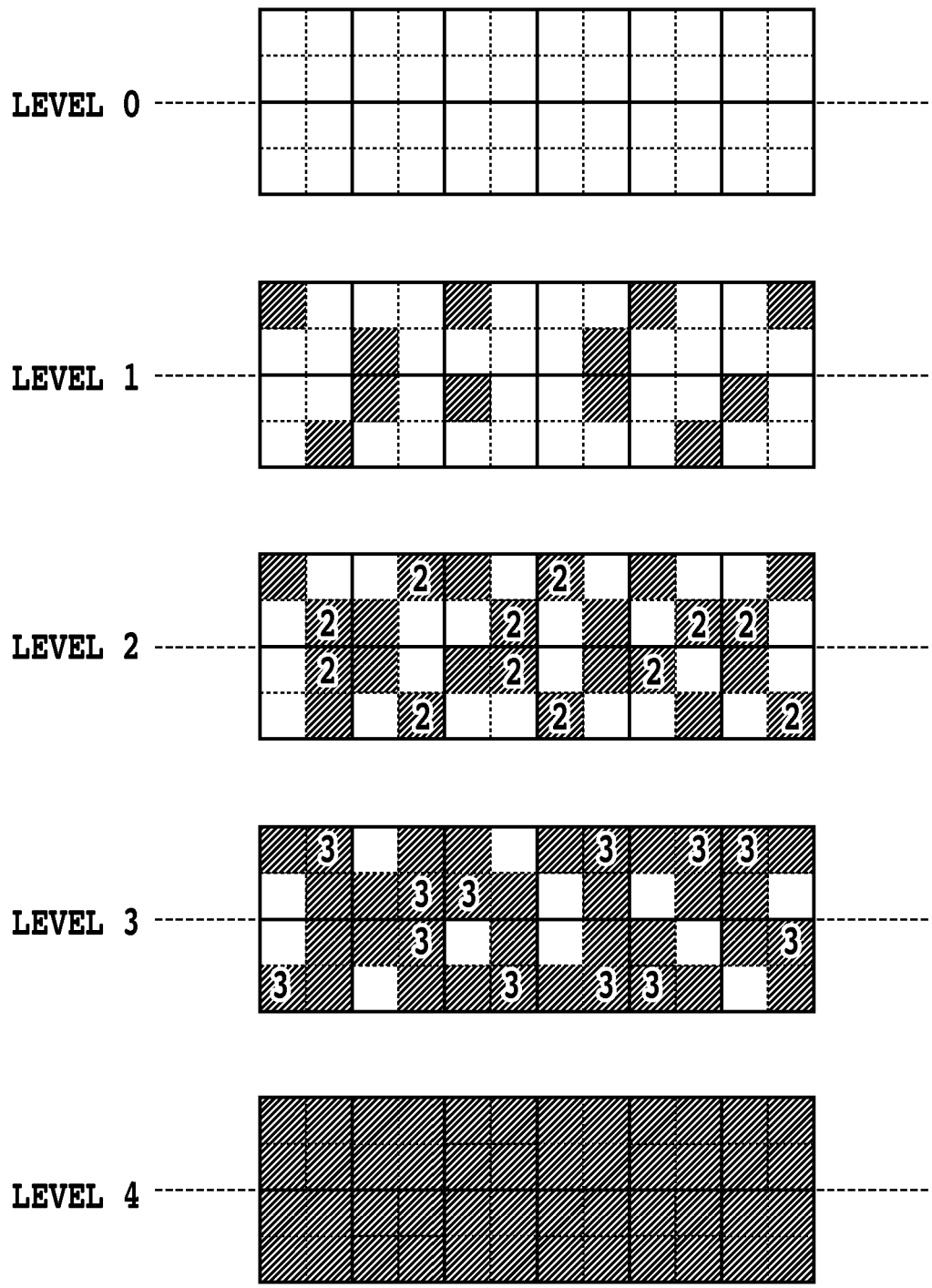
FIG. 5 is a diagram illustrating an example of dot printing patterns used in a first embodiment.

FIG. 5 is a diagram illustrating an example of dot arrangement patterns used in this embodiment. The level value that is illustrated at the left of the diagram corresponds to level 0 to level 4, which is the output value from the quantization processing unit, and expresses the density level of each of the pixels. The area comprising 2 areas×2 areas indicated by the bold line frame on the right side corresponds to a 1-pixel area that is outputted in the quantization process, and corresponds to the vertical and horizontal 1200 dpi printing density. Each area corresponds to the minimum unit for which printing (1) or no printing (0) of dots is defined, where here black areas are areas where a dot is printed and white areas are areas where a dot is not printed. As can be seen from the figure, as the level value increases, the number of areas in the 2×2 area where dots are printed increases. Moreover, for level 1 to level 3, a plurality of dot arrangement patterns are prepared in which the positions of the areas where dots are printed differ even though the level value is the same, and a plurality of these patterns are used alternately. These dot arrangement patterns are stored in advance in the ROM 211 of the device.

Returning again to FIG. 4, in the mask processing J0008, specified mask patterns that are stored in the ROM 211 are used to divide the binary image data into data that corresponds to each of the scans of the multi-pass printing. More specifically, a logical AND operation is performed between a mask pattern for which printing (1) or no printing (0) has been set for each area where each nozzle passes during one scan of the printing head, and binary image data that was outputted from the dot arrangement pattern processing K0007. As a result, binary image data that will actually be printed in one scan of the printing head is created.

After that, the created binary image data is sent to the head drive circuit J0009. A printing operation is then executed for each nozzle of the printing head 1000 at a specified timing according to the binary image data. In the following, the case of performing 2-pass multi-pass printing will be explained.

Figure 6:
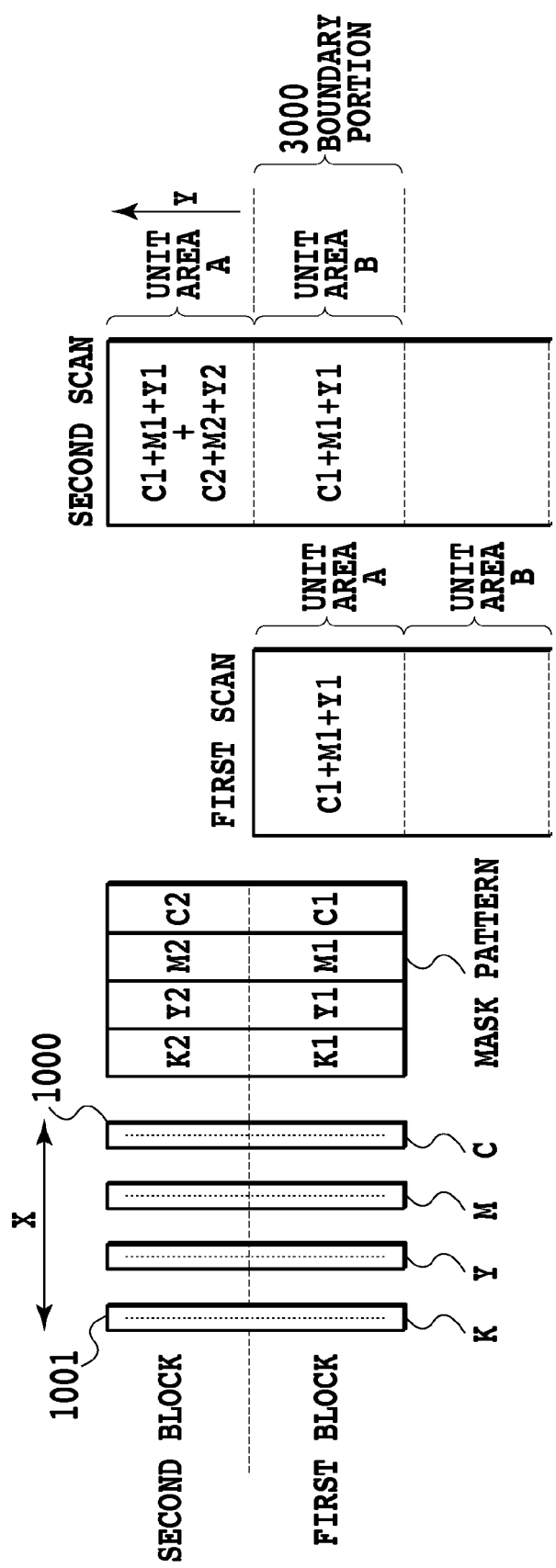
FIG. 6 is a schematic diagram for explaining the printed state in typical 2-pass multi-pass printing.

FIG. 6 is a schematic diagram for explaining the printed state in typical 2-pass multi-pass printing. When performing 2-pass multi-pass printing, the nozzle group 1001 of each color of the printing head 1000 is divided in the nozzle arrangement direction (Y direction) into a first nozzle block having 128 nozzles and a second nozzle block having 128 nozzles. Each individual nozzle block prints image data in each printing scan according to a mask pattern that is correlated with each of the nozzle block. After each time one printing scan is complete, the printing medium is conveyed in the Y direction a distance that corresponds to one nozzle block. With this kind of construction, an image is printed in unit areas on the printing medium that correspond to the width of the individual nozzle blocks by a first scan by the first nozzle block and a second scan by the second nozzle group.

Here, for example, supposing that mask pattern C1 is correlated with the first nozzle block for cyan, and mask pattern C2 is correlated with the second nozzle block for cyan. In this case, in the first scan, printing is performed by the first cyan nozzle block for the unit area A of the printing medium according to the mask pattern C1. After the printing medium has been conveyed an amount that corresponds to the width of the unit area A, then next, in the second scan, printing is performed by the second cyan nozzle block according to the mask pattern C2. Through these two scans, the sum of the mask patterns C1 and C2 are printed in cyan ink in the unit area A. When doing this, mask patterns C1 and C2 are in a complimentary relationship, and all of the binary data for cyan is printed in either the first scan by the first nozzle block or the second scan by the second nozzle block. In this way, in order to divide the binary image data among the two nozzle blocks, mask patterns are used to set whether to permit or not permit the printing of image data that corresponds to each individual pixel.

Figure 7:
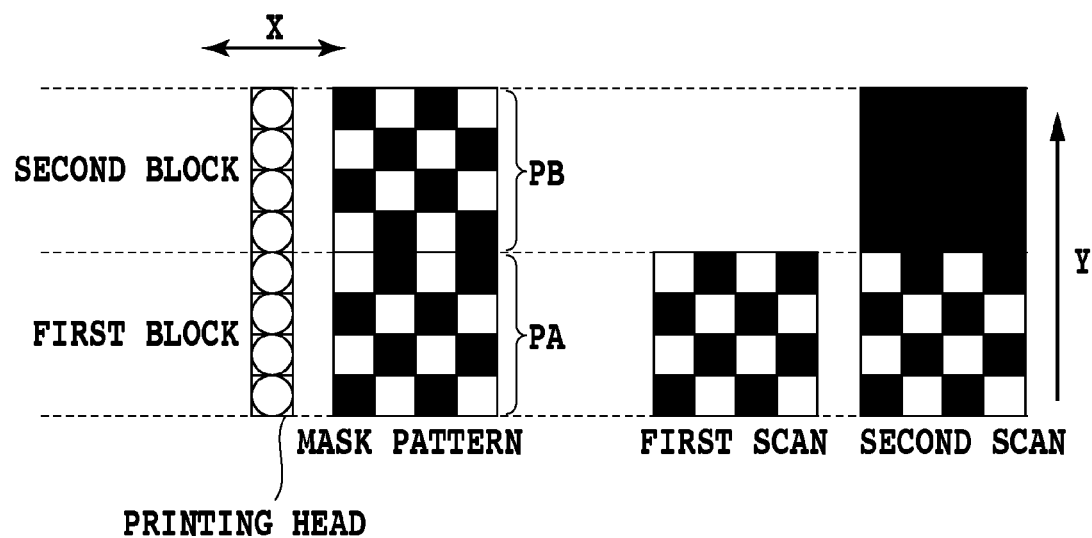
FIG. 7 is a schematic diagram for explaining a detailed example of a 2-pass mask pattern.

FIG. 7 is a schematic diagram for explaining a detailed example of a mask pattern in 2-pass multi-pass printing. Here, for simplicity, an example of a printing head having a total of eight nozzles that includes four nozzles in the first nozzle block an four nozzles in the second nozzle block. In this example, the mask pattern of the first nozzle block is PA, and the mask pattern of the second nozzle block is PB. Each mask pattern has 4 areas×4 areas, and black areas are areas where printing is permitted (printing permitted pixels), and white areas are areas where printing is not permitted (printing not-permitted pixels). The mask patterns PA and PB have a complimentary relationship with each other, where by the first scan by the first nozzle block and second scan by the second nozzle block, printing is completed in all of the pixels of a unit area of the printing medium.

Here, for simplicity, an example of a mask pattern is explained in which for an area that is 4 areas×4 areas, the printing permitted areas and printing not-permitted areas are arranged such that they are alternated. However, the size of mask patterns that are used in actual multi-pass printing can be set to be larger, and can be such that the arrangement of printing permitted areas and no-printing permitted areas is according to more irregular and more complex rules.

Referring again to FIG. 6, an image of the each of the unit areas is formed by two continuous main scans. In the boundary portion 3000, printing is performed by end section of the nozzle arrays. The boundary portion is a seam section between a previous scan (first scan) and a following scan (third scan) and the seam lines often appear. When the conveyance amount of the conveyance operation between the first scan and second scan is greater than a reference value, it becomes easy for a white stripe to be seen in the boundary portions. On the other hand, when the conveyance amount is less than a reference value, it becomes easy for a black stripe to be seen in the boundary portions 3000. The portions where seam lines can be easily seen in this way, the so-called boundary portions 3000, are arranged at a pitch that corresponds to the width of the nozzle blocks (a 128 nozzle pitch in this embodiment).

However, even when the conveyance error is the same in its amount, in the case of white stripes where the conveyance amount is greater than a reference value, and in the case of black stripes where the conveyance amount is less than a reference amount, how noticeable the stripes are is different. Moreover, even for the same kind of black stripes (or white stripes), how noticeable the stripes is different according to the image density around the boundary portions.

Figure 8:
FIG. 8 is a diagram comparing how noticeable white stripes and black stripes are in low-density areas and high-density areas.

FIG. 8 is a diagram for comparing how noticeable the white stripes and black stripes are in low-density areas and how noticeable the black stripes and white stripes are in high-density areas. For white stripes, the contrast in the white stripes and the surrounding area is higher for the white stripes that exist in high-density areas than in the low-density areas, so the white stripes become more noticeable in the high-density areas. However, for black stripes, the stripes that exist in low-density areas become more noticeable than the stripes that exist in high-density areas. The reason that this kind of contrast relationship between the surrounding density areas and the white stripes or black stripes occurs is explained below.

Figure 9:
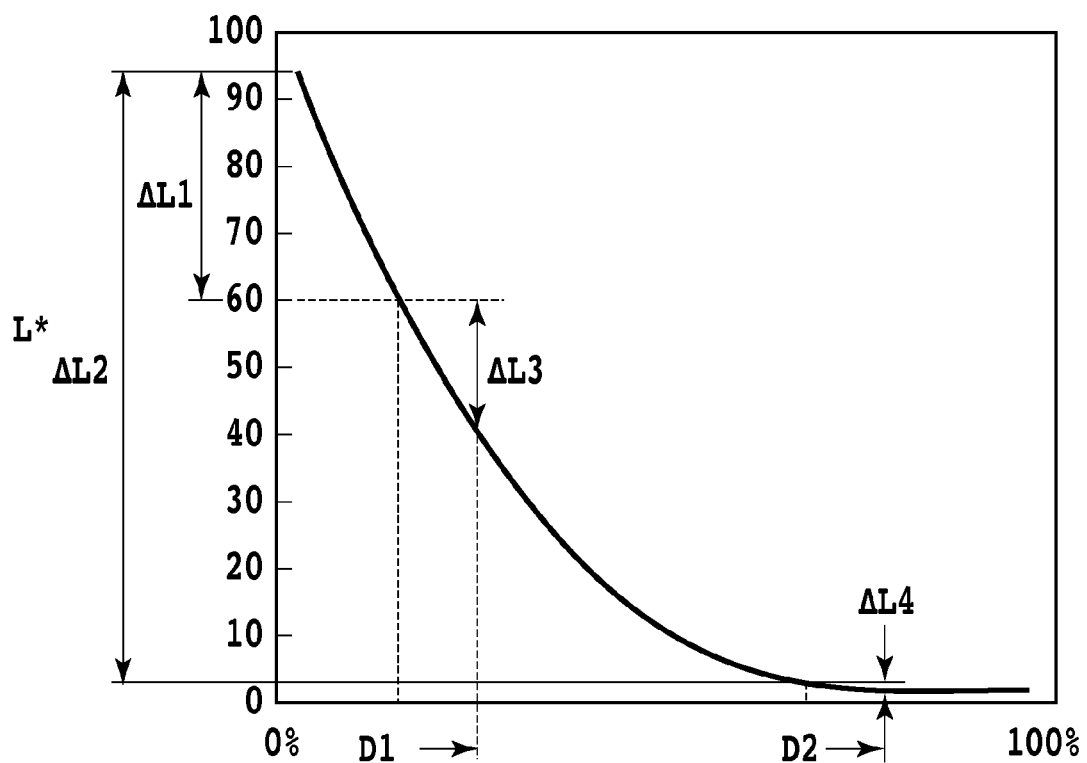
FIG. 9 is a diagram illustrating the relationship between the printing duty and luminance of black ink.

FIG. 9 is a diagram that illustrates the relationship between the printing duty and the luminance that appears on the printing medium for black ink. For the printing duty, 0% indicates a state in which no dots are printed, and 100% indicates a state in which dots are printed in all areas that are arranged in a 1200 dpi printing density. In the figure, in low-density areas where the printing duty is low, the change in luminance due to the change in printing duty is relatively large. However, in high-density areas where the printing duty is high, the change in luminance due to the change in printing duty is not so large.

Here, taking the printing duty in low-density areas to be D1 and the printing duty in high-density areas to be D2, the difference between the luminance at a printing duty of 0% in white stripe areas, or in other words, where dots are not printed, and each luminance at printing duties D1 and D2 are compared. In this case, it can be seen that the difference in luminance ΔL2 between the high-density area and the white stripe section is clearly greater than the difference in luminance ΔL1 between the low-density area and the white stripe section. In other words, white strips in high-density areas are more noticeable than white stripes in low-density areas.

On the other hand, the differences between each luminance at printing duties D1 in low-density area and at printing duties D2 in high-density area, and each luminance of black stripes that occur when dots of each printing duty overlap are compared. In this case, in both of high-density areas and low-density areas, the printing duty of black stripe sections becomes higher than in areas other than the boundary portions. However, the difference in luminance ΔL3 between the low-density area and the black stripe section is greater than the difference in the luminance ΔL4 between the high-density area and the black stripe section. In other words, the black stripes in low-density areas are more noticeable than black stripes in high-density areas. How noticeable white stripes or black stripes are in boundary portions is affected by not only shifting in conveyance, but also the density of the surrounding image.

However, for suddenly occurring conveyance error, it cannot be predicted whether there will be shifting in the white stripe direction or in the black stripe direction. Therefore, in this embodiment, in order to avoid very noticeable white stripes in high-density areas as the most damaging to image quality, a larger number of dots are set in advance for boundary portions in high-density areas. However, in low-density areas where it is difficult for white stripes to be less noticeable, but where black stripes are comparatively noticeable, the number of dots is not increased much in the boundary portions. Therefore, in this embodiment, image data is processed according to the density level in this way so that the higher the printing duty is, the larger the number of dots in the boundary portion is. In order to achieve this kind of image processing, mask patterns that are referenced in mask processing J0008, and dot arrangement patterns that are referenced in dot arrangement pattern processing are correlated and created in advance.

FIG. 10 is a diagram illustrating the level values for which each 2×2 area of one 600 dpi pixel becomes dot printing (1) by the dot arrangement pattern processing illustrated in FIG. 9. For example, in areas indicated by 1, when the level value of one 600 dpi pixel is 0, a dot is not printed; however, a dot is always printed for levels 1 to 4. On the other hand, for areas indicated by 4, dots are not printed for levels 0 to 3, and dots are only printed for level 4. In this way, on the printing medium, areas are set where dots are not printed unless the density is high, and areas are set where dots are printed from the low-density stage.

FIGS. 11A to 11D are diagrams that illustrate examples of a dot printing rate of 150% at the boundary portions based on the 2-pass mask patterns explained in FIG. 7. For example, In FIG. 11A, the entire area of the bottom end section of the mask pattern PA is a printing permitted area (printing permitted rate is 100%). By using this kind of mask pattern, when printing (1) is set in the dot arrangement pattern process, two dots each are printed in the diagonal areas in the figure. As a result, in the boundary portions that are formed during each conveying operation, more dots are printed than in the case when mask patterns having a complimentary relationship were used, and even though the conveyance amount is somewhat greater than a reference value, it is possible to keep the white stripes from becoming noticeable.

Figure 11A:
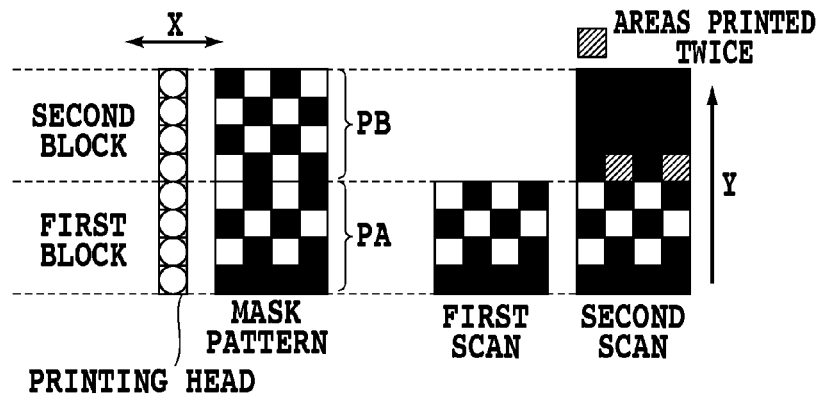
FIGS. 11A to 11D are diagrams illustrating examples of when the printing rate of a boundary portion is 150%.
Figure 11B:
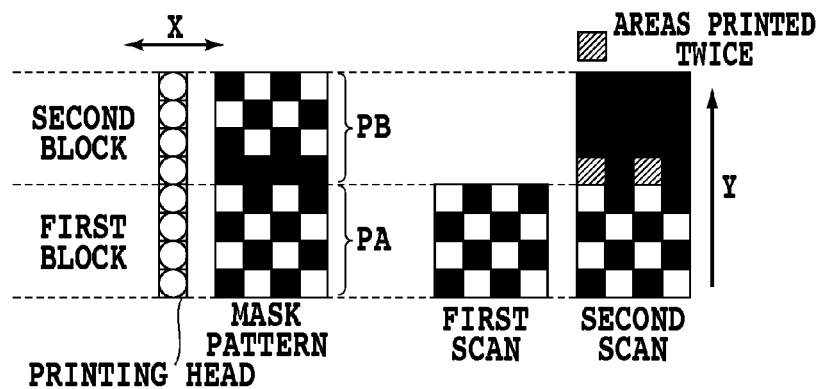
Figure 11C:
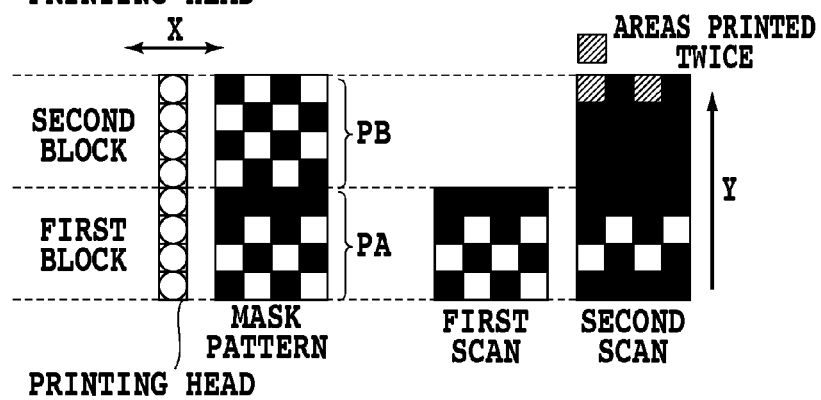
Figure 11D:
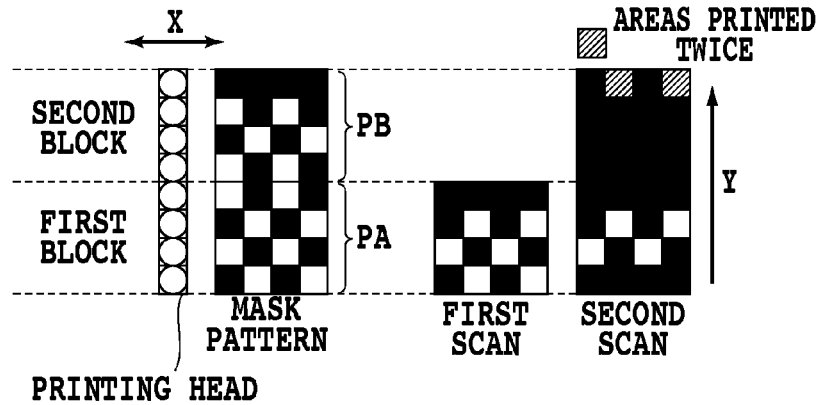

FIG. 11B illustrates an example where the entire area of the bottom end section of the mask pattern PB is a printing permitted area (printing permitted rate is 100%), and FIG. 11C illustrates an example where the entire top end section of the mask pattern PA is a printing permitted area (printing permitted rate is 100%). Furthermore, FIG. 11D illustrates an example where the entire top end section of the mask pattern PB is a printing permitted area (printing permitted rate is 100%). In all of the examples, in the diagonal areas in the figure, when printing (1) is set in the dot arrangement pattern process, two dots each will be printed. As a result, more dots than normal are printed in the boundary portions that are formed each time the conveyance operation is performed.

In the FIGS. 11A to 11D explained above, the case where the number of dots of the boundary portions simply becomes greater than in other areas was explained. However, in this embodiment, construction must be such that the number of dots in the boundary portions becomes greater according to the level number. Therefore, in this embodiment, mask patterns that were created to correspond with a dot arrangement pattern such as illustrated in FIG. 10 are prepared. More specifically, among the areas that correspond to boundary portions, for example areas indicated by "4" in FIG. 10, printing permitted areas of the mask pattern are set so that two dots are printed in half of those. Moreover, among the areas that correspond to the boundary portions, for the areas in FIG. 10 that are indicated by "3", printing permitted areas of the mask pattern are set so that two dots are printed in 20% of those. Furthermore, for the areas in FIG. 10 that are indicated by "2" or "1", printing permitted areas of the mask pattern are set so that dots are not overlapped in even in the boundary portions, and only one dot is printed in all areas. By setting printing permitted areas of the mask pattern according to rules such as these, it becomes possible to print more dots in the boundary portions the higher the printing duty is.

Figure 12:
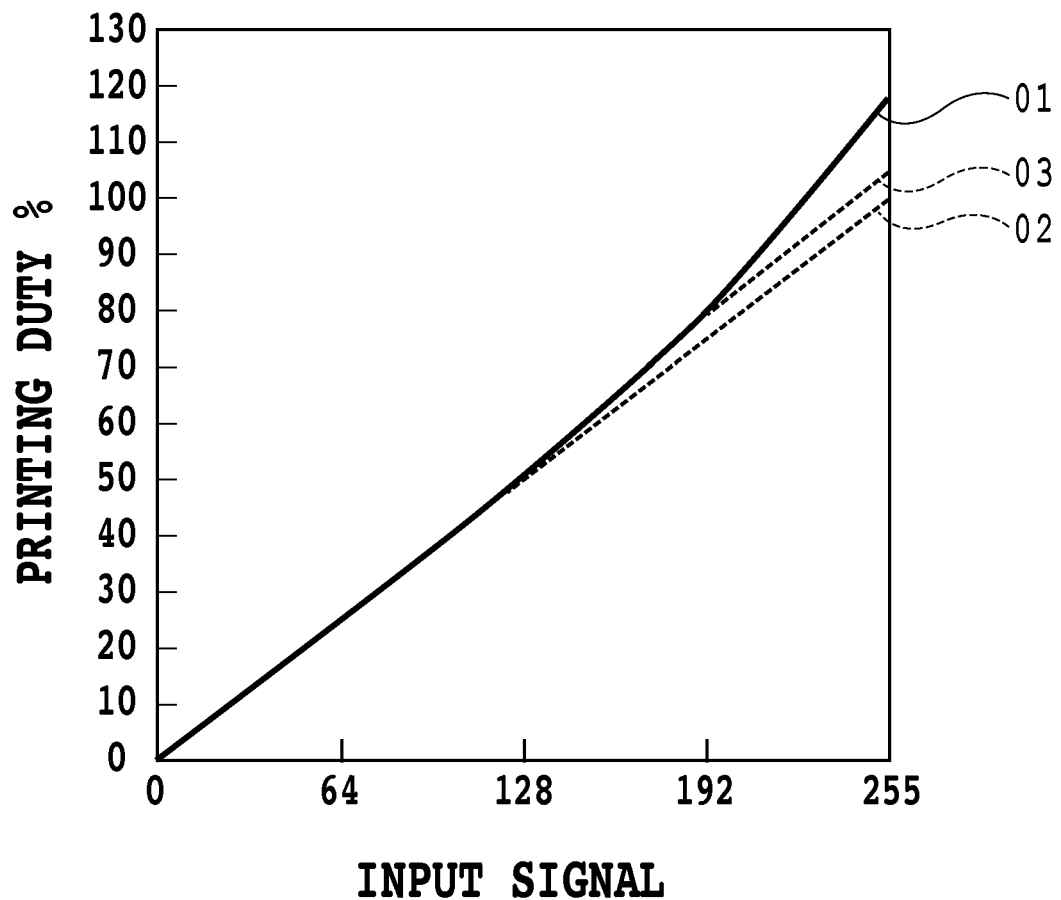
FIG. 12 is a diagram that illustrates the relationship between the input signal value and the printing duty at a boundary portion.

FIG. 12 is a diagram that illustrates the γ-corrected black (K) signal value (0 to 255) and the printing duty of dots that are actually printed on the printing medium at the boundary portions. For many pixels, the output value after quantization processing becomes level 1 when the input signal value is near 64, becomes level 2 when the input signal value is near 128, becomes level 3 when the input signal value is near 192 and becomes level 4 when the input signal value is near 255. In such a state, the track that is obtained by using a mask pattern that is correlated with a dot arrangement pattern as described above is illustrated by the bold line 01 in the figure. Up to an input signal value of about 128, the printing duty with respect to the input value is linear, however, in areas above 128 where level 3 that includes overlapping dots appears, areas where two dots each are printed gradually increase, so the slope of the printing duty also increases. In areas near 255 where the pixels become level 4, the areas where two dots are printed further increase, so the slope of the printing duty also becomes even greater.

On the other hand, the dashed line 03 illustrates the track that is obtained when two dots are printed in 50% of the areas where dots are printed at level 4 of the dot arrangement pattern; however, dots are not overlapped for areas where dots are printed for a level of 3 or less. Moreover, the dashed line 02 indicates the track that is obtained when dots are not overlapped for any levels, or in other words is the conventional construction. As can be seen by comparing these three kinds of tracks, with this embodiment, the slope of the printing duty in the boundary portions increases the higher the density value is.

Figure 13:
FIG. 13 is a diagram comparing how noticeable white stripes and black stripes are in high-density areas between the conventional method and the invention.
Figure 13:
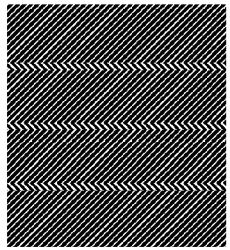
Figure 13:
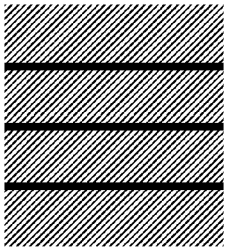
Figure 13:
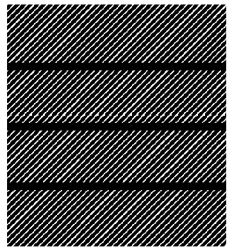

FIG. 13 is a diagram for comparing how noticeable white stripes and black stripes are in high-density areas when printing is performed using a conventional method and when correction has been performed such as in this embodiment. When correction such as this embodiment is performed, overlapping dots that are printed in the boundary portions bleed into the white stripe area, so when compared with when correction is not performed, the luminance of the white stripes becomes lower and the white stripes themselves become less noticeable. However, for black stripes, the overlapping dots that are printed in boundary portions increase when compared with when correction is not performed, however, because the luminance of the surrounding area is originally low, only the boundary portion does not become extremely noticeable even when compared with when correction was not performed.

Incidentally, above, a mask pattern was explained in which the dot overlap rate was adjusted according to the gradation characteristics of black as explained in FIG. 8; however, it is generally known that gradation characteristics such as illustrated in FIG. 8 differ according to the ink color used.

Figure 14:
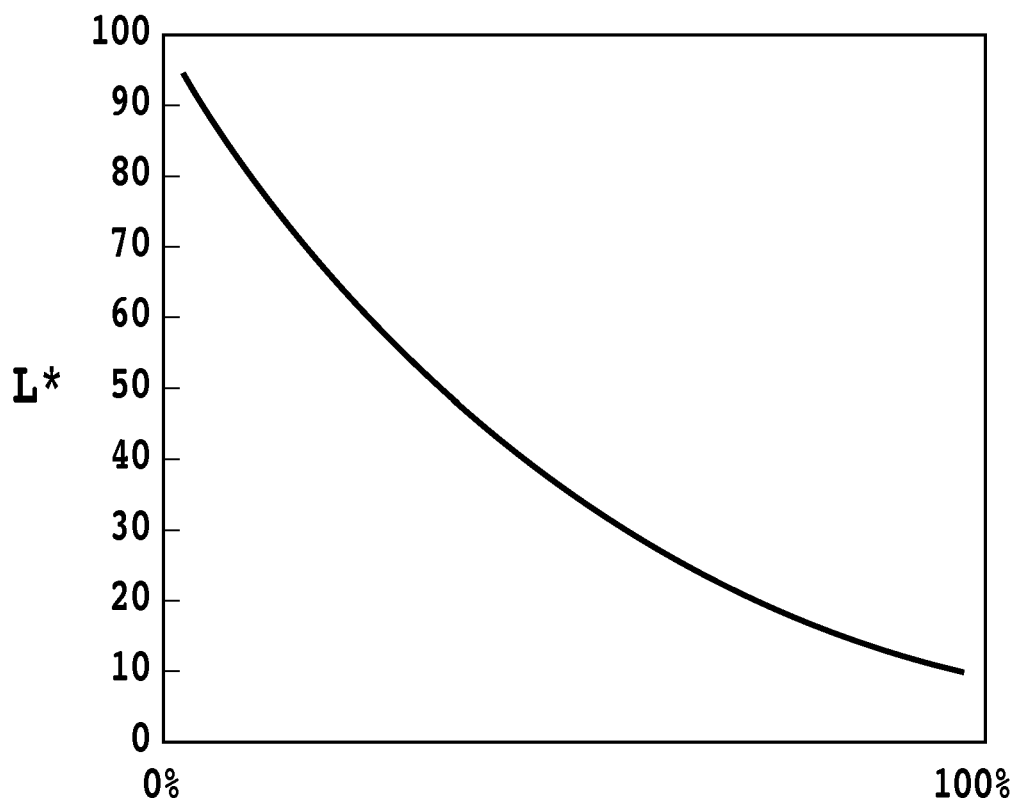
FIG. 14 is a diagram illustrating the relationship between the printing duty and luminance of cyan ink.

FIG. 14 is a diagram illustrating the relationship between the printing duty for cyan ink that has a lower color density than black ink and the luminance expressed on the printing medium. For cyan ink, the relationship between the printing duty and the luminance is closer to being linear than for black ink. In this case, how noticeable white stripes and black stripes are for each printing duty differs from the case of black ink.

Figure 15:
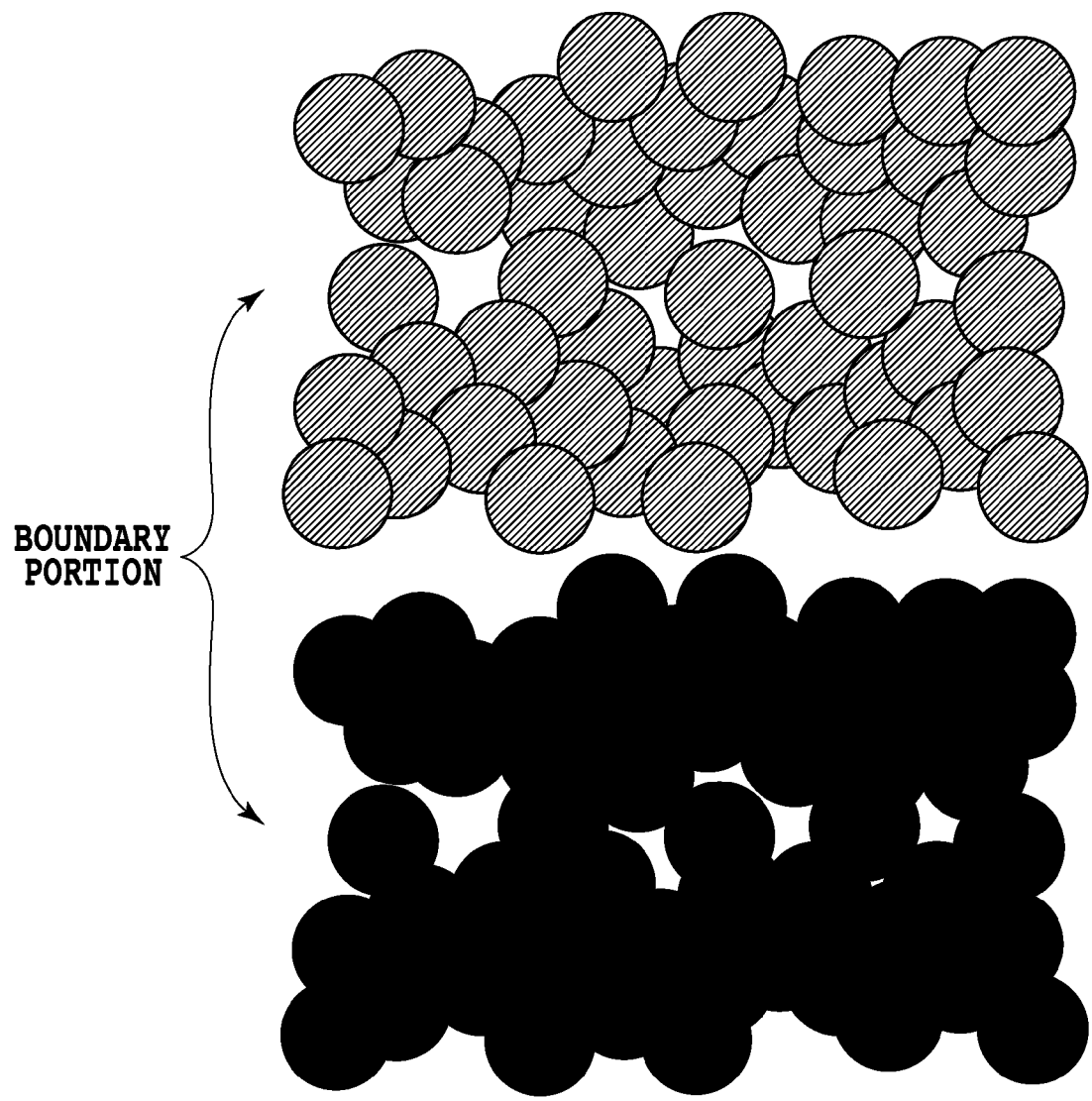
FIG. 15 is a schematic diagram for comparing how noticeable white stripes are for cyan ink and black ink.

FIG. 15 is a schematic diagram for illustrating how noticeable white stripes and black stripes are for cyan ink in comparison with black ink. For cyan ink, the luminance of the ink itself is not as low as that of black ink, so even when the printing duty is high, the difference in luminance between the white stripes and the surrounding area is not as great as in the case of black ink, and visually is not as noticeable. Therefore, in the case of cyan ink, it is often less necessary to print more dots in the boundary portions than in the case of black ink.

In this case, for cyan ink for example, printing permitted areas can be set so that for areas where dots are printed at level 4, overlapping dots are printed in 20% of the areas, and so that for areas where dots are printed at level 3 or less, dots are not overlapped. In order to adjust the relationship between the input value and the printing duty such as illustrated in FIG. 12 for each of the ink color independently, it is also possible to independently prepare mask patterns according to ink color. By doing so, it is possible to suitably adjust the number of dots in the boundary portions according to each ink color so that black stripes and white stripes are not noticeable for all ink colors. Moreover, in the case of using a plurality of inks having the same color phase but different luminance, such as black ink and gray ink, or in the case of using inks having different characteristics such as pigment ink and dye ink, it is also effective to suitably adjust the number of dots in the boundary portions for each ink. Typically, it can be said that when the luminance of the ink itself is low, and the more the relationship between the printing duty and the luminance expressed on the printing medium becomes non-linear as in FIG. 9, it is necessary to increase the number of dots in the boundary portion for high-density areas.

Moreover, the difference of how noticeable seam lines among ink colors explained above is appears even more when printing is performed on coated paper having a coating layer such as silica that absorbs ink than when printing is performed on plain paper. The reason for this is that in the case of coated paper, shapes of the dots due to the coloring material remain comparatively clear on the paper. Therefore, this embodiment can be said to function more effectively for coated paper than plain paper. How noticeable black stripes and white stripes are differs according to the type of paper in this way, so of course it is also effective to prepare mask patterns according to the type of printing medium.

Moreover, in FIGS. 11A to 11D above, boundary portions where overlapping dots were printed for one 1200 dpi pixel width were explained, however, this embodiment is not limited to a form such as this. It is also possible to print overlapping dots for two lines that are above and below a boundary portion, and it is also possible to make the number of overlapping dots differ for both of these lines. For example, by combining FIGS. 11A and 11D and increasing the number of printing permitted areas for two lines, a line on the bottom end section of the first block and a line on the top end section of the second block, it is possible to generate two lines of overlapping dots that surround the boundary portion. It is also possible to generate a plurality of lines of overlapping dots above and below the boundary portion.

In this case, it is preferred that the areas where the overlapping dots are generated be adjusted according to error in the conveyance amount of the printing device. Furthermore, even in the case of the same printing device, it is possible to adjust the areas where overlapping dots are generated according to the mode, for example overlapping dots on four lines surrounding the boundary portion on the top and bottom for a printing medium having a large conveyance error, and overlapping dots on only one line below the boundary portion for a printing medium having small conveyance error.

Moreover, the observation distance of a printed object and the awareness of white stripes and black stripes change according to the size of the printing medium, so adjusting the areas where overlapping dots are generated according to the size of the printing medium is also effective. For example, when observing a printed object that is size A1 or greater, often the printed object is observed at a further distance away than in the case of observing a printed object that is about size A4. Therefore, when printing on this kind of large printing medium, setting larger than normal areas where overlapping dots are generated is effective.

Moreover, the number of overlapping dots is not limited to being two dots as described above. Construction is also possible where three dots or more are printed in the same area. For example, mask patterns that allow the printing of two dots each in all areas in order to increase the overall density of the image have already been proposed. In order to obtain the effect of this embodiment while using this kind of mask pattern, it is possible to print three or more overlapping dots in the boundary portions. In other words, this embodiment functions efficiently by setting the printing permitted rate in areas of boundary portions, where dots are not printed in low-density and dots are printed in high-density, higher than in areas that are not boundary portions.

Furthermore, in the explanation above, an example of 2-pass multi-pass printing was explained; however, the present invention is not limited to this kind of construction. As long as the nozzle groups are divided into N number of blocks for N number of multi passes, and a mask pattern is used that has printing permitted areas such that overlapping dots occur in the areas of the boundary portions, the effect of this embodiment can be obtained. However, the smaller the number of multi passes there is, the more white stripes and black stripes become noticeable, so the effect of this embodiment appears the most in 2-pass multi-pass printing.

Moreover, lines for causing dots to overlap on the top end or on the bottom end of a nozzle block were prepared above; however, for example, nozzles for printing overlapping dots can be prepared separate from the normal nozzle blocks in the printing head.

Figure 16A:
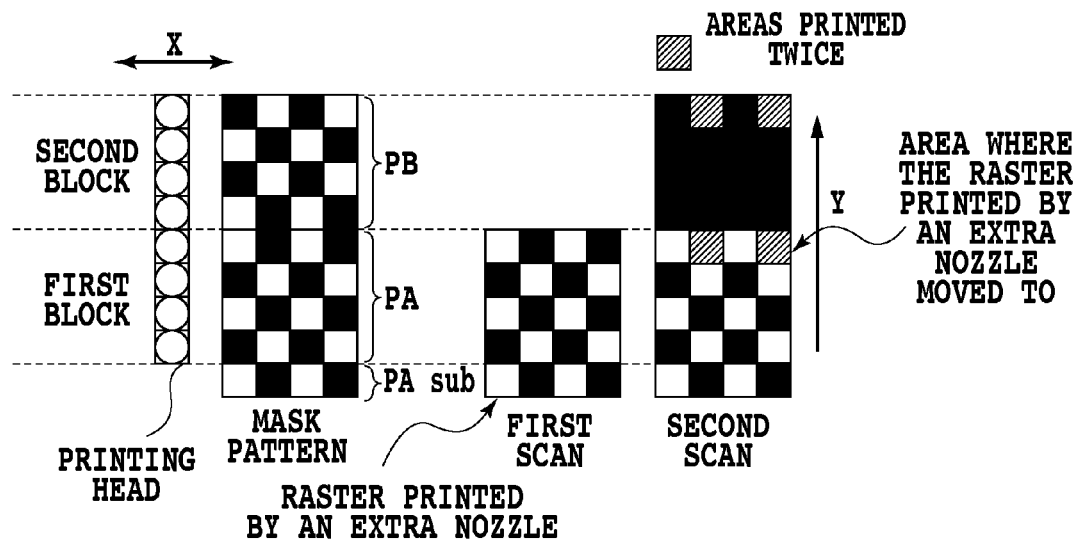
FIGS. 16A and 16B are diagrams illustrating construction in which one nozzle is prepared for the boundary portion.
Figure 16B:
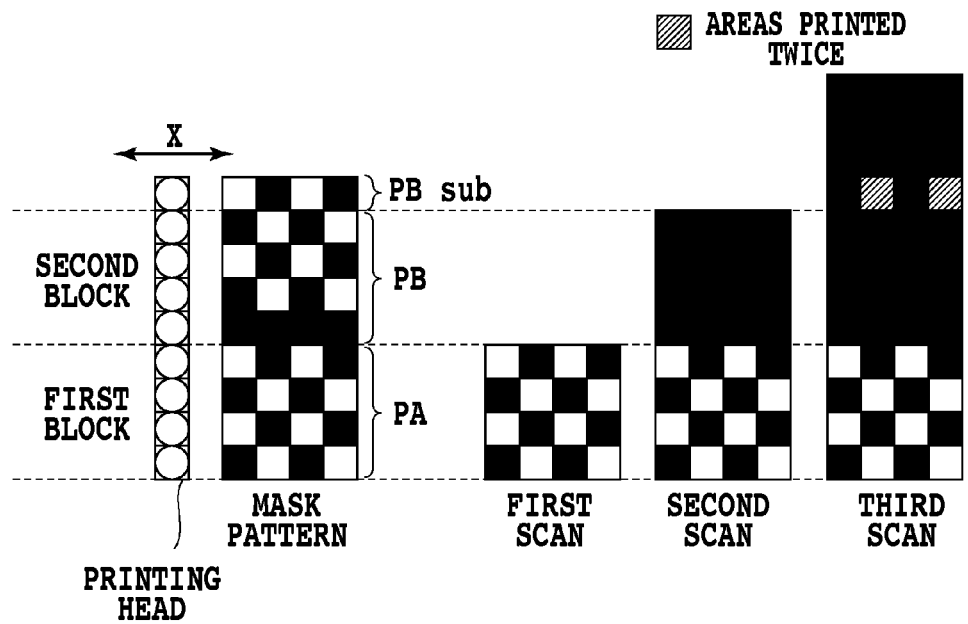

FIGS. 16A and 16B are diagrams illustrating construction based on the 2-pass mask pattern explained in FIG. 7, where a one-nozzle line is prepared for the boundary portions.

FIG. 16A is an example where the one nozzle on the bottom end section of the printing head is a nozzle for overlapping dots, and FIG. 16B is an example where the one nozzle on the top end section is a nozzle for overlapping dots. By preparing nozzles for overlapping dots in the boundary portions separate from the normal blocks in this way, it is possible to increase the number of dots in the boundary portions without locally increasing the overall printing permitted rate of the nozzles.

As described above, with this embodiment, correlatively created dot arrangement patterns and mask patterns are prepared so that the number of dots in boundary portions increases according to the level number. With such construction, it becomes possible to suppress white stripes in high-density areas without causing black stripes in low-density areas to become noticeable, and even for a small number of multi passes, it becomes possible to output a smooth image with no noticeable white stripes and black stripes at all gradations.

(Embodiment 2)

In this embodiment as well, the image printing system, printing apparatus and printing head that were explained in FIG. 1 to FIG. 4 are used. Image data is also processed so that the number of dots there are in boundary portions increases as the printing duty becomes higher. However, in this embodiment, instead of using dot arrangement patterns and mask patterns in order to achieve this kind of image processing, a seam correction process that is unique to this embodiment is provided between the pre-processing J0002 and post-processing J0003 in the printer driver.

Figure 17:
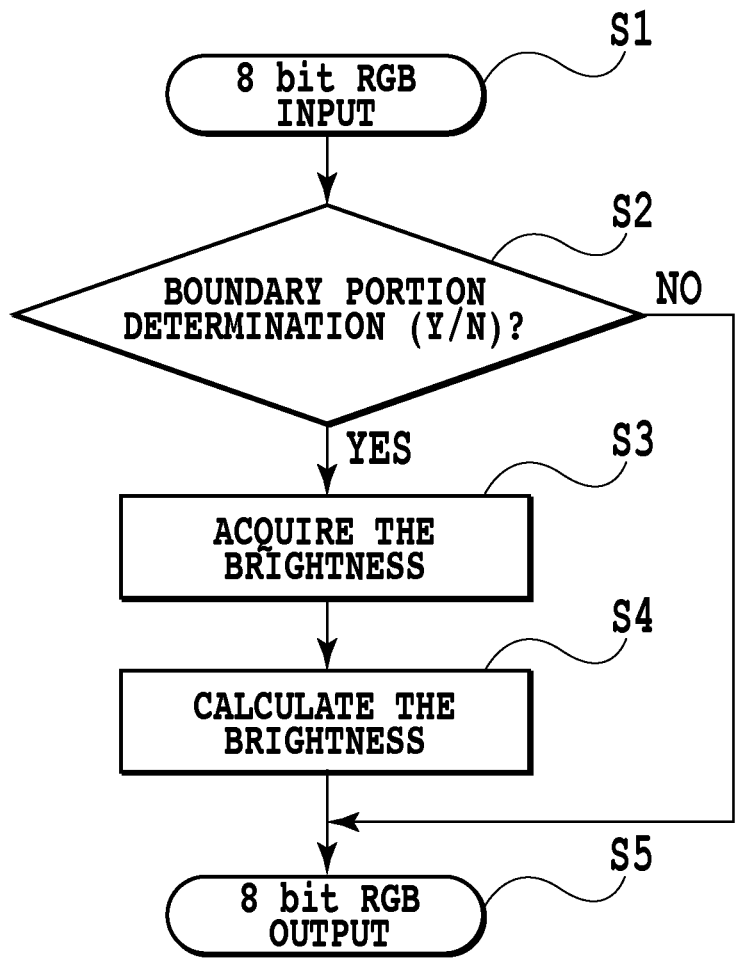
FIG. 17 is a flowchart illustrating the process for executing a boundary correction process of a second embodiment of the invention.

FIG. 17 is a flowchart for explaining the process of the printer driver executing the seam correction process of this embodiment. First, in step S1, RGB values are inputted from pre-processing J0002, then in step S2, it is determined whether or not the input data is pixel data corresponding to boundary portions. When it is determined that the input data does not correspond to boundary portions, processing jumps to step S5 in order to send the input data as is to post-processing. However, when it is determined that the input data is pixel data that corresponds to boundary portions, processing advances to step S3.

In step S3, the luminance L* is calculated from the input signal value RGB using a known calculation method. Then, in step S4, a subtraction value is set according to the luminance L* that was obtained in step S3, and that subtraction value is subtracted from the input signal value RGB. Here, this subtraction value is set beforehand so that it becomes a larger value the lower the luminance L* is (in other words, the higher the density is). In this way, in step S4, an RGB value is obtained that is a lower value than the inputted RGB, and the lower the luminance L* is, the value is converted to an even lower RGB value. After that, processing advances to step S5, and the RGB value for the boundary portion that has been converted to a lower value is outputted to post-processing.

Figure 18:
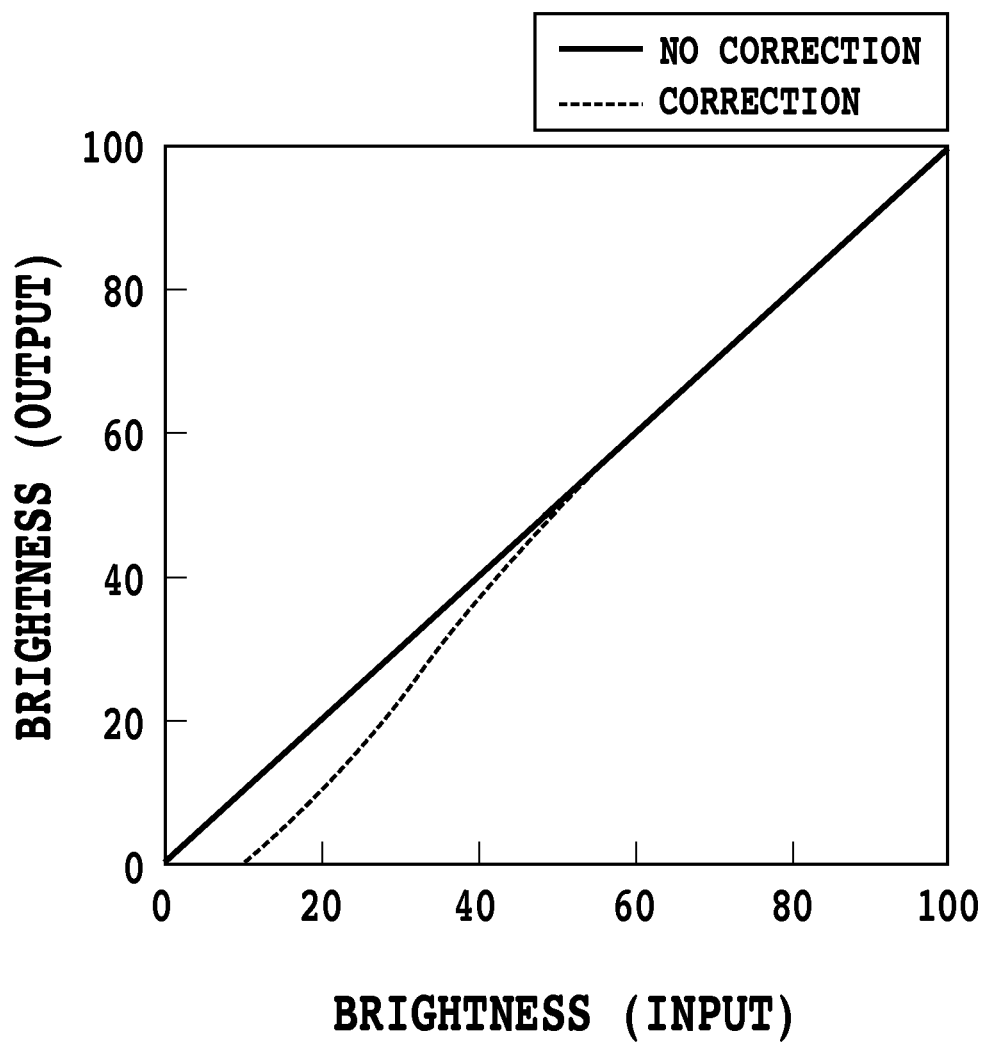
FIG. 18 is a diagram illustrating the relationship between the luminance L* of the input signal and output signal of a second embodiment.

FIG. 18 is a diagram for explaining the relationship between the luminance L* that is obtained from the input signal and output signal in step S4. In this embodiment, as in the first embodiment, the density of boundary portions only in high-density areas is actively increased without performing processing to actively increase the density of boundary portions in low-density areas. Therefore, for luminance having a specified value or greater (low-density areas), the output luminance value becomes equivalent to the input luminance value, and for luminance having a specified value or less (high-density areas), the output luminance is lower than the input luminance, the lower the input luminance is, the lower the output luminance becomes.

With the embodiment explained above, a seam correction process is executed so that the lower the luminance of the original image is in boundary portions, the luminance becomes even lower than other areas. As a result, it becomes possible to suppress white stripes in high-density areas without causing black stripes in low-density areas to become noticeable; and even for a small number of multi passes, it becomes possible to output a smooth image with no noticeable white stripes and black stripes at all gradations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-013019, filed Jan. 25, 2011, which is hereby incorporated by reference herein in its entirety.

What is claimed is:

1. An image processing apparatus for processing an image by ejecting ink to print dots on a print medium, comprising:
   a scanning unit configured to cause a print head having a nozzle array in which a plurality of nozzles for ejecting ink are arranged in an arraying direction to perform a plurality of scans across a unit area of the print medium in a scanning direction crossing the arraying direction;
   a conveying unit configured to convey the print medium a predetermined length in a conveying direction crossing the scanning direction between scans of the print head such that each of nozzle blocks is able to eject ink to the unit area in the plurality of scans, wherein each of the nozzle blocks is formed by a predetermined number of nozzles arrayed in the arraying direction continuously, and wherein the predetermined length corresponds to a length of each of the nozzle blocks in the arraying direction;
   an obtaining unit configured to obtain image data having a gradation value corresponding to pixel area areas in the unit area, wherein each of the pixel areas consists of a plurality of dot areas;
   a generating unit configured to generate a plurality of print data which determines printing or non-printing of a dot for each of dot areas based on the image data, wherein each of the plurality of the print data corresponds to one of the plurality of scans of the print head; and
   a controlling unit configured to control ink ejecting so as to eject ink according to each of the plurality of print data generated by the generating unit in each of the plurality of scans of the print head by the scanning unit,
   wherein the generating unit generates the plurality of print data such that (i) in a case that the obtaining unit obtains image data having a first gradation value, the amount of ink ejection to a first pixel area which is positioned at one end position in the conveying direction in the unit area and the amount of ink ejection to a second pixel area which is positioned at a different position from the first pixel area in the conveying direction in the unit area are substantially equal, and (ii) in a case that the obtaining unit obtains image data having a second gradation value which is greater than the first gradation value, the amount of ink ejection to the first pixel area is greater than the amount of ink ejection to the second pixel area.

2. The image processing apparatus according to claim 1, wherein the generating unit generates the plurality of print data such that (i) in the case that the obtaining unit obtains the image data having the first gradation value, the number of dots printed on the first pixel area and the number of dots printed on the second pixel area are substantially equal, and (ii) in the case that the obtaining unit obtains the image data having the second gradation value, the number of dots printed on the first pixel area is greater than the number of dots printed on the second pixel area.

3. The image processing apparatus according to claim 2, wherein the generating unit comprises:
   a first converting unit configured to convert the image data into binary data which determines the printing or non-printing of the dot for each of the dot areas in the plurality of scans of the print head by using dot arrangement patterns which determine the printing or non-printing of the dot for each of the dot areas, wherein each of dot arrangement patterns is determined with respect to each of the gradation values of the image data; and
   a second converting unit configured to convert the binary data into the plurality of print data by using a plurality of mask patterns, each of which includes print permitting areas which permit printing of the dots to the dot areas and non-print permitting areas which do not permit printing of the dots to the dot areas, wherein each of the plurality of mask patterns corresponds to one of the plurality of scans of the print head,
   wherein at least one predetermined dot area in the first pixel area corresponds to the print permitting areas in at least two mask patterns of the plurality of mask patterns, and wherein the predetermined dot area is the dot area which (i) determines the non-printing of the dot by a first dot arrangement pattern corresponding to the first gradation value, and (ii) determines printing of the dot by a second dot arrangement pattern corresponding to the second gradation value.

4. The image processing apparatus according to claim 1, further comprising:
   a second obtaining unit configured to obtain luminance of the image based on the image data; and
   or adjusting unit configured to adjust the luminance of the image data corresponding to the first pixel area, wherein the adjusting unit (i) adjusts the luminance of the image data according to a first reduction ratio in a case that the second obtaining unit obtains a first luminance, and (ii) adjusts the luminance of the image data according to a second reduction rate which is higher than the first reduction rate in a case that the second obtaining unit obtains a second luminance which is lower than the first luminance.

5. The image processing apparatus according to claim 1, further comprising:
a second obtaining unit configured to obtain information about a type of print medium,
wherein the generating unit generates the plurality of print data such that the amount of ink ejection to the first pixel area in a case that the obtaining unit obtains image data having the second gradation value and the second obtaining unit obtains information indicating coated paper is more than the amount of ink ejection to the first pixel area in a case that the obtaining unit obtains image data having the second gradation value and the second obtaining unit obtains information indicating plain paper.

6. The image processing apparatus according to claim 5, wherein the generating unit generates the plurality of print data such that, in the case that the obtaining unit obtains image data having the second gradation value and the second obtaining unit obtains information indicating plain paper, the amount of ink ejection to the first pixel area and the amount of ink ejection to the second pixel area are substantially equal.

7. The image processing apparatus according to claim 1, wherein the print head has a nozzle array for ejecting a first color ink and a nozzle array for ejecting a second color ink, wherein the second color is different from the first color, and
wherein the generating unit generates the plurality of print data such that an amount of second color ink ejection to the first pixel area in a case that the obtaining unit obtains image data having the second gradation value of the second color is more than an amount of first color ink ejection to the first pixel area in a case that the obtaining unit obtains image data having the second gradation value of the first color.

8. The image processing apparatus according to claim 7, wherein the generating unit generates the plurality of print data such that, in a case that the obtaining unit obtains image data having the second gradation value of the first color ink, the amount of ink ejection to the first pixel area and the amount of ink ejection to the second pixel area are substantially equal.

9. An image processing method for processing an image by ejecting ink to print dots on a print medium, comprising:
using a processor to cause a print head having a nozzle array in which a plurality of nozzles for ejecting ink are arranged in an arraying direction to perform a plurality of scans across a unit area of the print medium in a scanning direction crossing the arraying direction;
using the processor to convey the print medium a predetermined length in a conveying direction crossing the scanning direction between scans of the print head such that each of nozzle blocks is able to eject ink to the unit area in the plurality of scans, wherein each of the nozzle blocks is formed by a predetermined number of nozzles arrayed in the arraying direction continuously, and wherein the predetermined length corresponds to a length of each of the nozzle blocks in the arraying direction;
using the processor to obtain image data having a gradation value corresponding to pixel areas in the unit area, wherein each of the pixel areas consists of a plurality of dot areas;
using the processor to generate a plurality of print data which determines printing or non-printing of a dot for each of dot areas based on the image data, wherein each of the plurality of the print data corresponds to one of the plurality of scans of the print head; and
using the processor to control ink ejecting so as to eject ink according to each of the plurality of print data in each of the plurality of scans of the print head,
wherein the plurality of print data is generated such that (i) in a case that image data having a first gradation value is obtained, the amount of ink ejection to a first pixel area which is positioned at one end position in the conveying direction in the unit area and the amount of ink ejection to a second pixel area which is positioned at a different position from the first pixel area in the conveying direction in the unit area are substantially equal, and (ii) in a case that image data having a second gradation value which is greater than the first gradation value is obtained, the amount of ink ejection to the first pixel area is greater than the amount of ink ejection to the second pixel area.

10. The image processing method according to claim 9, wherein the plurality of print data is generated such that (i) in the case that the image data having the first gradation value is obtained, the number of dots printed on the first pixel area and the number of dots printed on the second pixel area are substantially equal, and (ii) in the case that the image data having the second gradation value is obtained, the number of dots printed on the first pixel area is greater than the number of dots printed on the second pixel area.

11. The image processing method according to claim 10, wherein the generating comprises:
using the processor to convert the image data into binary data which determines the printing or non-printing of the dot for each of the dot areas in the plurality of scans of the print head by using dot arrangement patterns which determine the printing or non-printing of the dot for each of the dot areas, wherein each of dot arrangement patterns is determined with respect to each of the gradation values of the image data; and
using the processor to convert the binary data into the plurality of print data by using a plurality of mask patterns, each of which includes print permitting areas which permit printing of the dots to the dot areas and non-print permitting areas which do not permit printing of the dots to the dot areas, wherein each of the plurality of mask patterns corresponds to one of the plurality of scans of the print head,
wherein at least one predetermined dot area in the first pixel area corresponds to the print permitting areas in at least two mask patterns of the plurality of mask patterns, and wherein the predetermined dot area is the dot area which (i) determines the non-printing of the dot by a first dot arrangement pattern corresponding to the first gradation value, and (ii) determines printing of the dot by a second dot arrangement pattern corresponding to the second gradation value.

* * * * *